United States Patent
Patel et al.

(10) Patent No.: US 9,160,549 B2
(45) Date of Patent: *Oct. 13, 2015

(54) METHOD AND APPARATUS FOR PROVIDING BRIDGELESS CONFERENCING SERVICES

(71) Applicant: Vonage Network LLC, Holmdel, NJ (US)

(72) Inventors: Vishal Patel, New Brunswick, NJ (US); Nirav J. Kadakia, Parlin, NJ (US); Jason Farkas, Belle Meade, NJ (US); Stephen Van Saders, Manalapan, NJ (US); Tzahi Efrati, Hoboken, NJ (US)

(73) Assignee: Vonage Network LLC, Holmdel, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/950,017

(22) Filed: Jul. 24, 2013

(65) Prior Publication Data

US 2015/0029899 A1 Jan. 29, 2015

(51) Int. Cl.
*H04M 3/42* (2006.01)
*H04L 12/18* (2006.01)
*H04M 3/56* (2006.01)
*H04L 29/06* (2006.01)

(52) U.S. Cl.
CPC .......... *H04L 12/1818* (2013.01); *H04L 12/185* (2013.01); *H04L 12/1822* (2013.01); *H04L 65/1069* (2013.01); *H04L 65/4038* (2013.01); *H04M 3/563* (2013.01); *H04M 3/569* (2013.01); *H04L 12/1827* (2013.01)

(58) Field of Classification Search
CPC ....... H04M 3/56; H04M 3/563; H04M 3/564; H04L 12/1818; H04L 12/1822; H04L 12/185; H04L 12/1827; H04L 65/1069; H04L 65/4038
USPC .................. 379/158, 202.01, 204.01, 206.01, 379/207.01; 370/260, 261; 455/416
See application file for complete search history.

(56) References Cited

U.S. PATENT DOCUMENTS

| | | | | |
|---|---|---|---|---|
| 6,925,166 | B1 * | 8/2005 | Chan ......................... | 379/265.02 |
| 8,346,864 | B1 * | 1/2013 | Amidon et al. ............... | 709/204 |
| 2002/0118808 | A1 * | 8/2002 | Kelleher et al. .......... | 379/202.01 |
| 2005/0152523 | A1 * | 7/2005 | Fellenstein et al. ...... | 379/202.01 |
| 2008/0037751 | A1 * | 2/2008 | Aldrey et al. ............. | 379/202.01 |
| 2011/0307287 | A1 * | 12/2011 | Conley ......................... | 705/7.19 |
| 2012/0275349 | A1 * | 11/2012 | Boyer et al. .................. | 370/261 |

OTHER PUBLICATIONS

Fielding, R.T., "Architectural Styles and the Design of Network-based Software Architectures", University of California, Irvine, 2000, 180 pages.

* cited by examiner

*Primary Examiner* — Antim Shah

(74) *Attorney, Agent, or Firm* — Duane Morris LLP; Joseph Pagnotta

(57) ABSTRACT

A system and method for making a VoIP-based and other types of group calls includes a user interface adapted for use by a group call administrator via the Internet, a database manager connected to the user interface, and a database connected to the database manager. In one embodiment of the invention, the group call administrator identifier and one or more group call invitee identifiers is a telephone number. A method includes using call information from the database to initiate conference call connections and an administrator call connection to facilitate a conference call in which the administrators call connections and the participants connections are joined to allow communications between the participants and the administrator.

6 Claims, 7 Drawing Sheets

METHOD AND APPARATUS FOR PROVIDING BRIDGELESS CONFERENCING SERVICES

CROSS REFERENCES

This application is co-pending and concurrently filed with U.S. patent application Ser. No. 13/950,051 entitled "METHOD AND APPARATUS FOR PROVIDING BRIDGELESS CONFERENCING SERVICES" filed Jul. 24, 2013, and U.S. patent application Ser. No. 13/950,071 entitled "METHOD AND APPARATUS FOR PROVIDING BRIDGELESS CONFERENCING SERVICES" filed Jul. 24, 2013. The entirety of these documents are incorporated herein by reference.

FIELD

The disclosed subject matter is related to the field of telecommunication devices and services and more specifically, the disclosed subject matter is directed to an apparatus (system) and method that provides customers of a telecommunication system based on Voice over Internet Protocol (VoIP) with the ability to perform a group calling function.

BACKGROUND

VoIP is a technological development in the field of telecommunications that is utilized to transmit voice conversations over a data network using Internet Protocol (IP) rather than the existing and traditional telecommunications system more commonly referred to as the Public Switched Telephone Network (PSTN) or Plain Old Telephone Service (POTS). Entities (e.g., businesses, organizations, individuals) implement VoIP by purchasing and installing the necessary equipment (e.g., one or more Customer Premises Equipment (CPE) devices) to access a VoIP service provider and activating this telecommunication service via a broadband connection.

There are many PSTN-originated telecommunication features that VoIP subscribers may desire or expect so as to mimic the existing technology. One such feature is group or conference calling where it is possible to connect multiple parties calling from multiple phone lines into a single communication session. It is possible for VoIP to duplicate the "feel" of a conference call (where callers each dial in to a conference bridge (in the form of a server or similar type of computer processing device) and are subsequently connected to each other to form the communication session). However, this places a burden on each caller to obtain a communication session or main access number to the conference bridge device and perform dial-in and login/security actions to become part of the desired communication session. There is also a further burden on the conference call administrator (the individual who is planning or otherwise hosting the conference call) to initially purchase, install or otherwise provide for the necessary infrastructure to carry out the conference call and subsequently disseminate the above-identified dial-in and login information prior to the scheduled time of the conference call. These administrative hurdles detract from the overall experience of group communications. With the advent of web-based applications, it has become easier for data to be shared among an increasing number of users. However, there is a lack of integration of PSTN-style conference or group calling and web-based applications to facilitate this type of communication via the Internet.

Accordingly, there is a need in the art for an apparatus and method for providing VoIP subscribers with the ability to perform conference calling via a web-based interface to improve the overall experience, and add significant features previously unavailable.

SUMMARY

The disadvantages associated with the prior art are overcome by a method and system for group calling in an IP-based communication system. The method includes the steps of receiving a group call administrator identifier, receiving one or more group call invitee identifiers, initiating a first group call connection from a Group Calling Server (GCS) and initiating at least one or more second group call connections from the central location to join a group call administrator and at least one group call invitee. The group call administrator identifier and one or more group call invitee identifiers can be a telephone number or other identifiers associated with users of the communication system. To establish the group call, the group call administrator identifier and one or more group call invitee identifiers are received from the group call administrator. The first group call connection initiation is to the group administrator and the second or more group call connection initiations are to the at least one group call invitee. The central location for the first group call connection initiation and the second or more group call connection initiations is the VoIP service provider equipment. The step of receiving a group call administrator identifier occurs via a first internet connection between a group call administrator and a VoIP service provider. The step of receiving one or more group call invitee identifiers also occurs via a first internet connection between a group call administrator and a VoIP service provider. In one embodiment of the invention, the method is practiced by a computer readable medium storing a software program that, when executed by a computer and being initiated in response to a communication request placed via an interface of a VoIP service subscriber, causes the computer to perform an operation of VoIP-based group calling as described above.

A system for making a VoIP-based group call includes a user interface adapted for use by a group call administrator via the Internet, a database manager connected to the user interface, a database connected to the database manager, a group call load balancer connected to the user interface and a group calling pool adapted for SIP-based group call setup. The user interface further comprises a first field for receiving a group call administrator identifier and at least one second field for receiving one or more group call invitee identifiers. In one embodiment of the invention, the group call administrator identifier and one or more group call invitee identifiers is a telephone number. The group calling pool includes a plurality of servers wherein each server responds to one group call request made by the group call administrator. Each server responds to a group call request by initiating a first group call connection and initiating at least one or more second group call connections to join a group call administrator and at least one group call invitee.

A method of establishing a conference call between an administrator and a group of users selected by the administrator as participants in the conference call is disclosed. In the method the administrator and users are remote from a central location. The method includes receiving call information on the group of users from the administrator at the central location; initiating conference call connections from the central location to the participants using the call information; initiating an administrator conference call connection from the central location to the administrator. The method also includes connecting the conference call connections to each other and connecting the administrators conference call connection at the central location, to thereby allow communications between the participants and the administrator.

Advantages over the prior art are provided by a method of establishing a conference call between an administrator and a group of users from a central location remote from both the administrator and users. The method includes receiving identifiers from an administrator. The identifiers are associated with the group of users selected by the administrator to participate in the conference call. The identifiers are used to access a database to obtain information about each of the participants. Using this information, conference call connections from the central location to the participants are established and the conference call connections are then connected at the central location to allow communications between the participants and the administrator.

BRIEF DESCRIPTION OF THE FIGURES

So that the manner in which the above recited features of the disclosed subject matter are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

To facilitate understanding, identical reference numerals have been used, where possible, to designate identical elements that are common to the figures.

DETAILED DESCRIPTION

To achieve the desired objectives, the disclosed subject matter provides IP-based telecommunication services (i.e., VoIP) subscribers with the ability to initiate advanced call features associated with the service such as, but not limited to, group or conference calling. The disclosed subject matter also is available to those on other channels that can connect with the VoIP provider over the internet. Real-time management and control of the features are executed by a system in an IP-based environment (i.e., the Internet) via one or more interfaces. Since both the telecommunication services and the management systems operate over IP, the limitations associated with a PSTN telecommunication service are overcome and full exploitation of broadband capabilities are enjoyed to improve the overall experience.

In a preferred embodiment of the invention, the management functions operate as part of a larger VoIP telecommunication service. Such telecommunication service is, by way of example, part of any public or private data network (or combination thereof) constructed for (in part) and adapted to convert analog voice signals (e.g., generated by a human utterance) to a digitized and packetized format according to known and understood protocols (such as but not limited to Transmission Control Protocol/Internet Protocol (TCP/IP)) for transmission from an originating point (Party A) to one or more terminating points (Party B and/or C, D and the like). In a preferred embodiment of the invention, the data network is an IP-based network such as (but not limited to) the Internet having VoIP specific and related components connected thereto.

Figure 1:
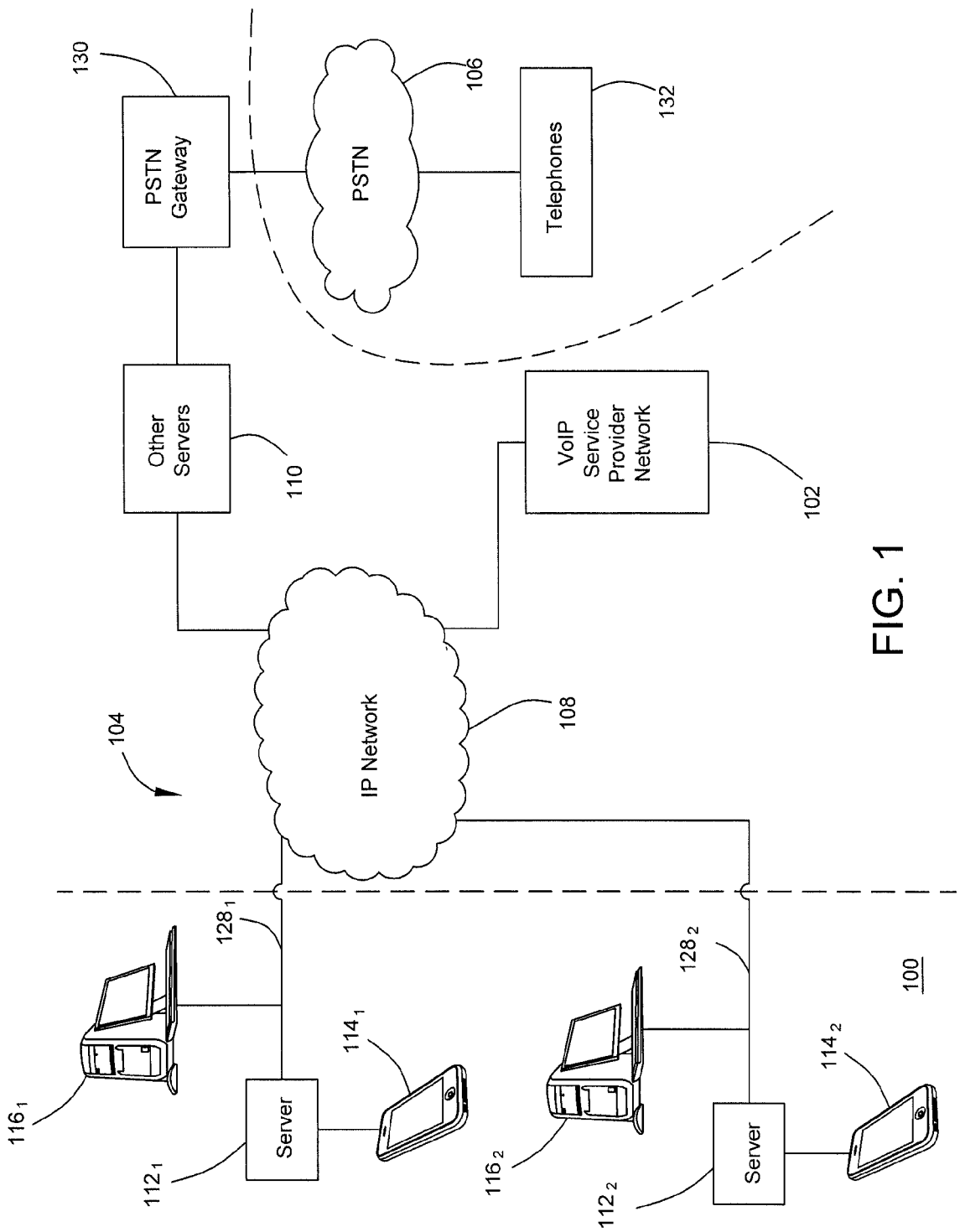
FIG. 1 is a block diagram depicting an exemplary embodiment of a VoIP-based, group calling enabled communication system in accordance with the disclosed subject matter.

FIG. 1 is a block diagram depicting an exemplary embodiment of a communication system 100 in accordance with one or more aspects of the invention. The communication system 100 includes a voice-over-internet-protocol (VoIP) network 104 and (optionally) a public switched telephone network (PSTN) 106. The VoIP network 104 includes a VoIP Service Provider Network 102 and a plurality of VoIP-service related servers 110 coupled to an internet protocol (IP) network 108. The servers 110 may be various well known servers configured to facilitate VoIP services, such as provisioning servers, proxy servers, media relay servers, and the like including but not limited to additional servers described below regarding specifics of the disclosed subject matter. The VoIP Service Provider Network 102 is configured to provide the necessary infrastructure and call processing capabilities to set up, execute and tear down VoIP communication sessions. The VoIP Service Provider Network 102 and servers 110 may be implemented using a plurality of computer systems and like type general and/or specific purpose devices and systems. The one or more of the servers 110 may be coupled to a PSTN gateway 130, which in turn is coupled to the PSTN 106. The PSTN 106 provides conventional telephone service to a plurality of telephones 132.

Various customer premises equipment (CPE) 112n are coupled to the IP network 108 via links 128n. Various communication devices 114n can be coupled to the CPE 112n. The CPE 112n may include modems, terminal adapters, routers, and the like configured to provide an interface between the communication devices 114n and the IP network 108. The communication devices 114n can comprise telephones, video phones, computers, mobile devices, and the like. The CPE 112n and the communication devices 114n can be distributed among a plurality of subscribers to VoIP services provided by the VoIP network 104. The links 128n can include cable, fiber optic, digital subscriber line (DSL), or like type communication links known in the art. Additionally, one or more secondary communication devices 116n may be connected to the IP network 108 via links 128n. Such secondary communication devices 116 are for example computers and other network-capable devices that share bandwidth or packet network services with the CPE's 112n connected (in an exemplary manner in the subject invention) downstream on the links 128n.

In general operation, subscribers use the communication devices 114n and the CPE 112n to covert content (e.g., voice, video, data, some or all of which may be analog) and signaling into VoIP-based content and signaling ("a VoIP call"). VoIP calls can be transmitted to the IP network 108 via the CPE 112n over the links 128n. Those skilled in the art will appreciate that the VoIP calls may pass through other IP networks before reaching the IP network 108 of the VoIP network 104. For example, the VoIP calls may pass through various IP networks of the Internet before being routed to the IP network 108 (e.g., internet service provider (ISP) networks, backbone networks, etc.). VoIP calls may be processed by the servers 110. VoIP calls in general and those of a conference call or group call nature as described in further detail below can be directed to other subscribers of the VoIP network 104, to subscribers of other VoIP networks (not shown), or to subscribers of traditional telephone services (e.g., the PSTN 106).

Generally, when a subscriber activates their service (i.e., a VoIP service), they have access to a number of features, such as but not limited to call features like call waiting, call forwarding, do not disturb, caller ID, and the like. Additionally, the subscriber can have access to other IP-based services, such as instant messaging, email, and the like. Tying services and features together adds to the flexibility and pervasiveness of the services in general so that their adoption becomes increasingly widespread. In some embodiments, the VoIP network 104 provides a method and apparatus for managing and establishing group calls so that subscribers can create and schedule such calls with a minimum of interaction and preparation by all involved parties of the group as well as minimizing the cost associated with the required infrastructure to perform such group calls. The group calling feature can be facilitated by the VoIP Service Provider Network 102. For clarity, only a single element is shown for the VoIP Service Provider Network 102. Those skilled in the art will appreciate that the VoIP Service Provider Network 102 can include more than one element interconnected to various other elements/components to achieve the desired result.

Figure 2:
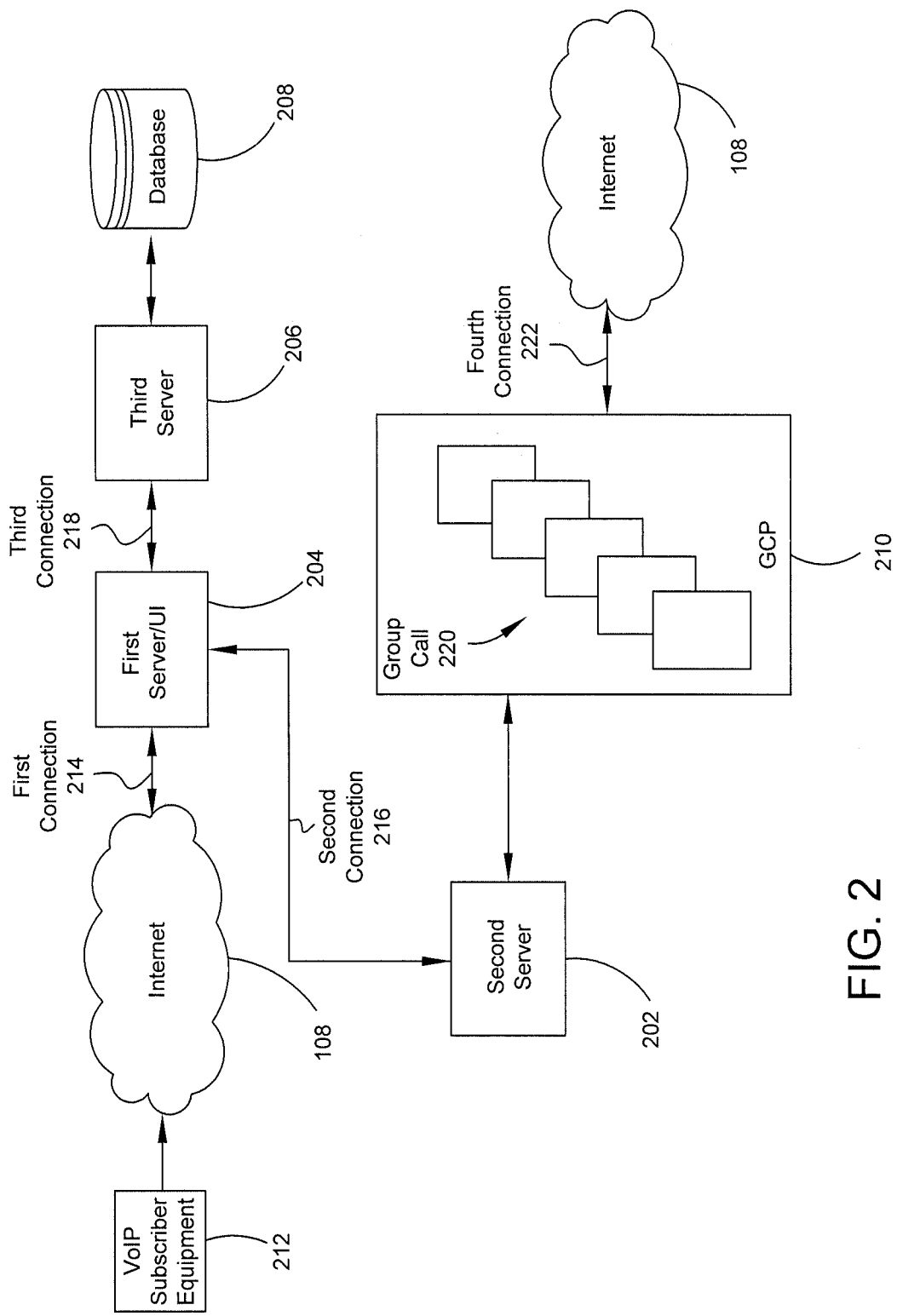
FIG. 2 is a schematic diagram of a group calling system within the VoIP-based communication system in accordance with the disclosed subject matter.

FIG. 2 is a schematic diagram of a group calling system (GCS) 200 within the VoIP Service Provider Network 102 in accordance with the disclosed subject matter. Generally, the GCS 200 is a plurality of servers 202, 204, 206 having specific functionality and roles in the group calling process, a database 208 for retaining information relevant to the group calling process and a pool of group call processors (GCP) 210 for fulfilling group call requests. Note that while the GCS 200 depicts connection to a packet-based network such as the Internet 108, such network is exemplary in nature and not part of the specific invention. Connection to other packet-based networks are possible and within the scope of the invention.

A first server 204 of the plurality of servers functions as a user interface (UI). That is, the first server/UI 204 provides the graphical, audio, video and other related capabilities to create an interface between VoIP subscriber equipment 212 and the GCS 200. The VoIP subscriber equipment includes but is not limited to the CPE 112*n*, Communication Devices 114*n* and secondary communication devices 116*n* described above with respect to FIG. 1. In one embodiment of the invention, the UI has the look and feel of a directory of names that are part of the VoIP subscriber's list of contacts. The directory may show all or part of the total number of contacts (depending on a display screen size (also part of VoIP subscriber equipment 212) and configuration that is driven by the UI, number of total contacts or user organizational preferences (i.e., alphabetical, groups, sub-groups and the like)). Interaction between the first server/UI 204 and the VoIP subscriber is enabled via a first connection 214 of the first server/UI 204 to a packet-based network such as the Internet 108. In one embodiment of the invention, the first connection 214 is a Hyper Text Transfer Protocol (HTTP) as is commonly known in the art of packet-based network communications. In a preferred embodiment of the invention, the UI 204 is created and executed using a Ruby on Rails-based application using RESTful communication on a Red Hat LINUX® platform running on IBM hardware although the UI 204 is operable on other combinations of software and hardware including MICROSOFT® WINDOWS® running on compatible devices.

The first server/UI 204 is further connected to a second server 202 via a second connection 216 and a third server 206 via a third connection 218. In one embodiment of the invention, the second and third connections 216 and 218 are via HTTP using the Representational state transfer (REST) style of software architecture. REST is more fully disclosed in "Architectural Styles and the Design of Network-based Software Architectures" by Roy Thomas Fielding, 2000 herein incorporated by reference.

The second server 202 functions as a Load Balancer for the GCP 210 as described in greater detail below. Generally, the second server/Load Balancer 202 assigns group calling tasks to specific pool "members" 220 of the GCP 210 and maintains the state of calls and requests. In one embodiment of the invention, the second server/Load Balancer 202 is created on a Red Hat LINUX® platform running on IBM hardware although same is operable on other combinations of software and hardware including MICROSOFT® WINDOWS® running on compatible devices.

The third server 206 functions as a Manager for the database 208. That is, information is maintained in the database 208 in order to execute group calling functions based on VoIP subscriber requests. The third server/Manager 206 acts as an abstraction layer for the database 208 in order to relay the requested information from the database 208 to the second server/Load Balancer 202 and GCP 210. In a preferred embodiment of the invention, the third server/Manager 206 is created, and its tasks executed by using a Ruby on Rails-based application using RESTful communication on a Red Hat LINUX® platform running on IBM hardware although the UI 204 is operable on other combinations of software and hardware including MICROSOFT®. WINDOWS® running on compatible devices.

The GCP 210 further comprises a plurality of group call servers 220 (pool members) for responding to group call setup requests by the VoIP subscriber as identified above. Each group call server 220 processes one group call request. As a group call request is processed, the appropriate group call session set up process is executed via a fourth connection 222 between the GCP 210 and a packet-based network such as the Internet 108. In one embodiment of the invention, Session Initiation Protocol (SIP) is used as the connection protocol to execute the group call session set up (and subsequent tear down) steps. SIP is a signaling protocol for initiating, managing and terminating media (e.g., voice, data and video) sessions across packet based networks that typically use the Internet Protocol (IP) of which VoIP is an example. The details and functionality of SIP can be found in the Internet Engineering Task Force (IETF) Request for Comments (RFC) Paper No. 3261 entitled, "SIP: Session Initiation Protocol" herein incorporated in its entirety by reference. As the number of group call requests fluctuates (based on the rate of new group call requests/session set ups and conclusion of group calls/session tear downs), the second server/Load Balancer 202 manages the GCP 210 to optimize call flow. In one embodiment of the invention, this management process is performed via open source software and preferably using ASTERISK® v1.2.14. ASTERISK® is an open source product created by Digium, Inc. of Huntsville, Ala. and released under the GNU General Public License (GPL). In a preferred embodiment of the invention, each of the plurality of group call servers 220 is created on a Red Hat LINUX® platform running on IBM hardware although same is operable on other combinations of software and hardware including MICROSOFT® WINDOWS® running on compatible devices.

Figure 3:
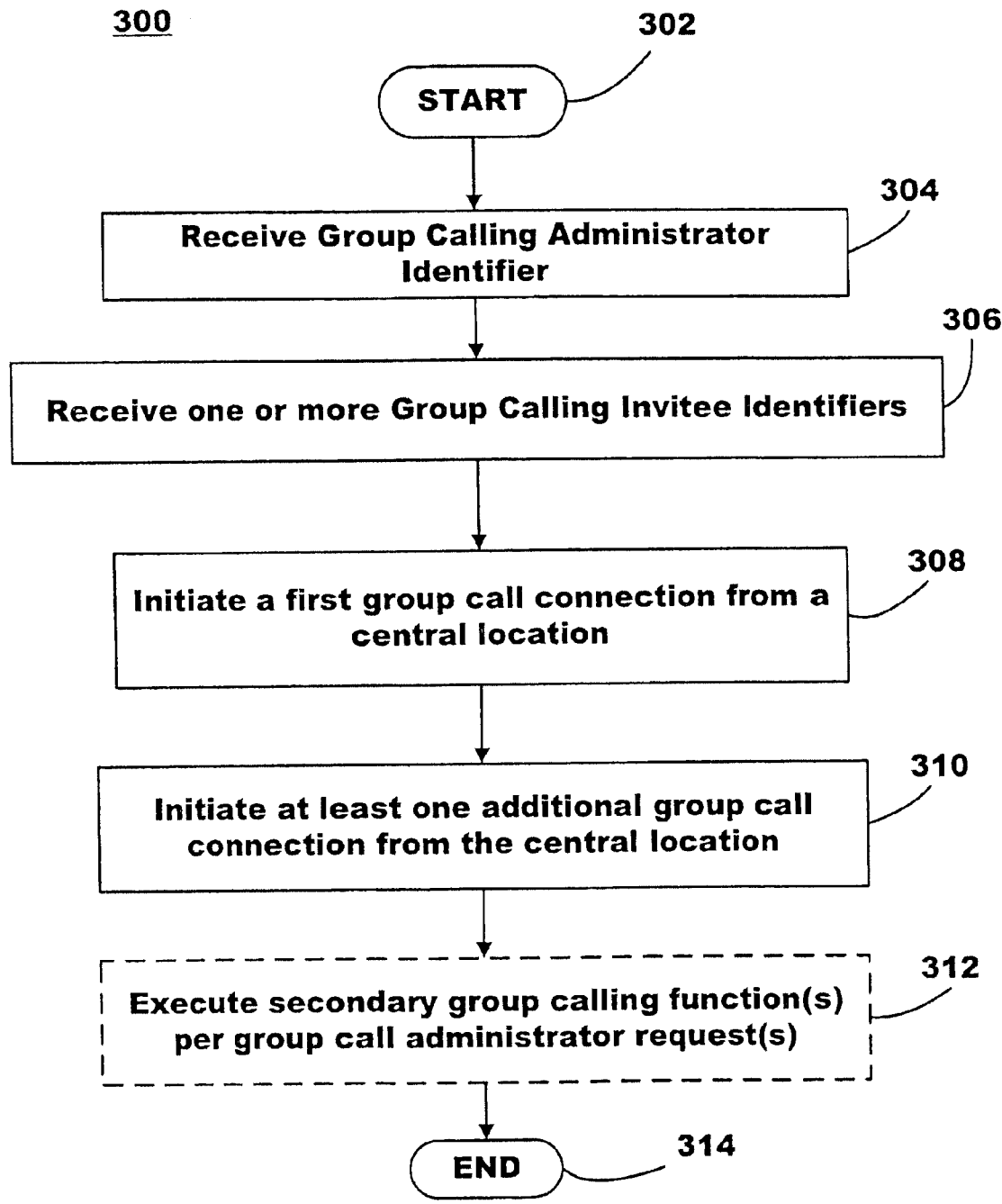
FIG. 3 is a flowchart depicting a method of group call processing in accordance with the disclosed subject matter.

FIG. 3 depicts a series of method steps 300 for performing group calling in an IP-based communication system in accordance with the disclosed subject matter. The method is, in one embodiment of the invention, practiced in the GCS 200 as introduced and described above to create a "bridgeless" conference call system. The group calling method 300 starts at step 302 and proceeds to step 304 where a group calling administrator identifier is received. For example, a VoIP subscriber desires to establish a group calling session between himself and at least two other parties. As such, he accesses the GCS 200 (via first server/UI 204, "calling" or invoking the GCS 200) and activates a Group Calling feature available therethrough. As a result, information identifying the VoIP subscriber as the group call administrator will be sent to and subsequently received by the GCS 200. The group call administrator identifier is selected from the group of possible identifiers consisting of VoIP subscriber user name, VoIP subscriber account number, VoIP subscriber instant messaging identifier, VoIP subscriber telephone number and other authorized subscriber telephone number (i.e., a telephone number that is not necessarily provided or assigned by the VoIP provider). Other identifiers are possible and are known to those skilled in the art.

At step 306, one or more group calling invitee identifiers is received. For example, a VoIP subscriber (after having identified himself as the group calling administrator as described above) desires to establish a group calling session between himself and at least one other party. As such, he continues to access the GCS 200 (via first server/UI 204) and selects one or more group calling invitees available therethrough. As a result, information identifying the one or more selected group calling invitees will be sent to and subsequently received by the GCS 200. The group call invitee identifier is selected from the group of possible identifiers consisting of contact name of invitee given by VoIP subscriber, group call invitee telephone number, VoIP subscriber instant messaging identifier, VoIP subscriber telephone number and other authorized subscriber telephone number (i.e., a telephone number that is not necessarily provided or assigned by the VoIP provider). Other identifiers are possible and are known to those skilled in the art. Note that there can be up to n invitees where n is limited by the number of group call participants that can be supported by the system architecture and hardware.

At step 308, a first group call connection is initiated from a central location. More particularly and in one embodiment of the invention, once the GCS 200 has all of the necessary information to initiate a group call (namely an administrator identifier and two or more invitee identifiers), the GCS 200 attempts to make the group call in accordance with the VoIP subscriber's request. The group call starts with the GCS 200 placing a call to the administrator who has identified himself as such earlier. For example, one of the servers from the group calling server pool 220 begins executing a group calling session set up by calling the administrator. If the administrator answers the call (i.e., picks up his phone to place it in an "off-hook" condition), the GCS 200 receives acknowledgement that the group call administrator has accepted the group call session request. If the administrator does not answer the call, the GCS 200 tears down the group call session to free up the group call server 220 and allow it to service another group call request. In some disclosed embodiments, the connection to administrator need not be initiated prior to the additional group call connections.

At step 310, at least one additional group call connection is initiated from a central location. More particularly, and in one embodiment of the invention, once the group call administrator has accepted the group call session request from the GCS 200, the GCS 200 attempts to finalize the group call session set up in accordance with the VoIP subscriber's request. The GCS 200 places a call to the at least one group call invitee that the administrator had identified earlier. For example, the server 220 from the group calling server pool that initiated the first group call connection continues the group calling session set up by calling the at least one group call invitee. If at least one of the group call invitee(s) answers the call (i.e., picks up his phone to place it in an "off-hook" condition), the GCS 200 receives acknowledgement that the group call invitee has accepted the group call session request and connects such invitee(s) to the administrator and other accepted invitees. That is, even if only two parties comprise the group call, (appearing to be a "regular phone call" between two parties), the GCS 200 maintains the call with all attendant features and functionality of a group call as discussed above.

At step 312, one or more group calling secondary functions are optionally executed. Specifically, once the group call is initiated, there may be circumstances where call control features have to be invoked by the group call administrator during the group call in order to achieve the desired results. Such call control features are executable in real time (i.e., during the group call) via the first server/UI 204 for real time modification of the user experience. In one embodiment of the invention, the group call administrator accesses the first server/UI 204 and requests modification, initiation or termination of a group call feature therethrough while maintaining basic group call dynamics. The request can be made via manipulation of a graphical icon, performing a drag and drop operation of old/new group call attendees from/to the group call or other operations known to those skilled in the art. Non-limiting examples of group calling features that can be managed in real time are selected from the group consisting of mute/unmute call participants, invoking re-invite requests to one or more parties and removing one or more parties from an existing group call although other features are additionally contemplated. The benefits of such capabilities include being able to view the status of these optional features (and the group call in general) in real time via the UI 204. The method ends at step 314. The implementation of the caucusing features described later may also be requested through the manipulation of graphical icons.

Graphical icons or avatars may also be used by the administrator for the selection of the participants and also may be used to indicate who is not only a participant in the group call, but also who is speaking in real time. The designation of the speaker may be made by the central location by examination of the voice or data packets, or codes embedded therein and the designation to the participants. The real time indication of the speaker may be realized by a change in color or appearance of the icon or avatar associated with the speaker. This real time indication of the speaker advantageously allows the participants to keep track of the conversation.

Figure 4:
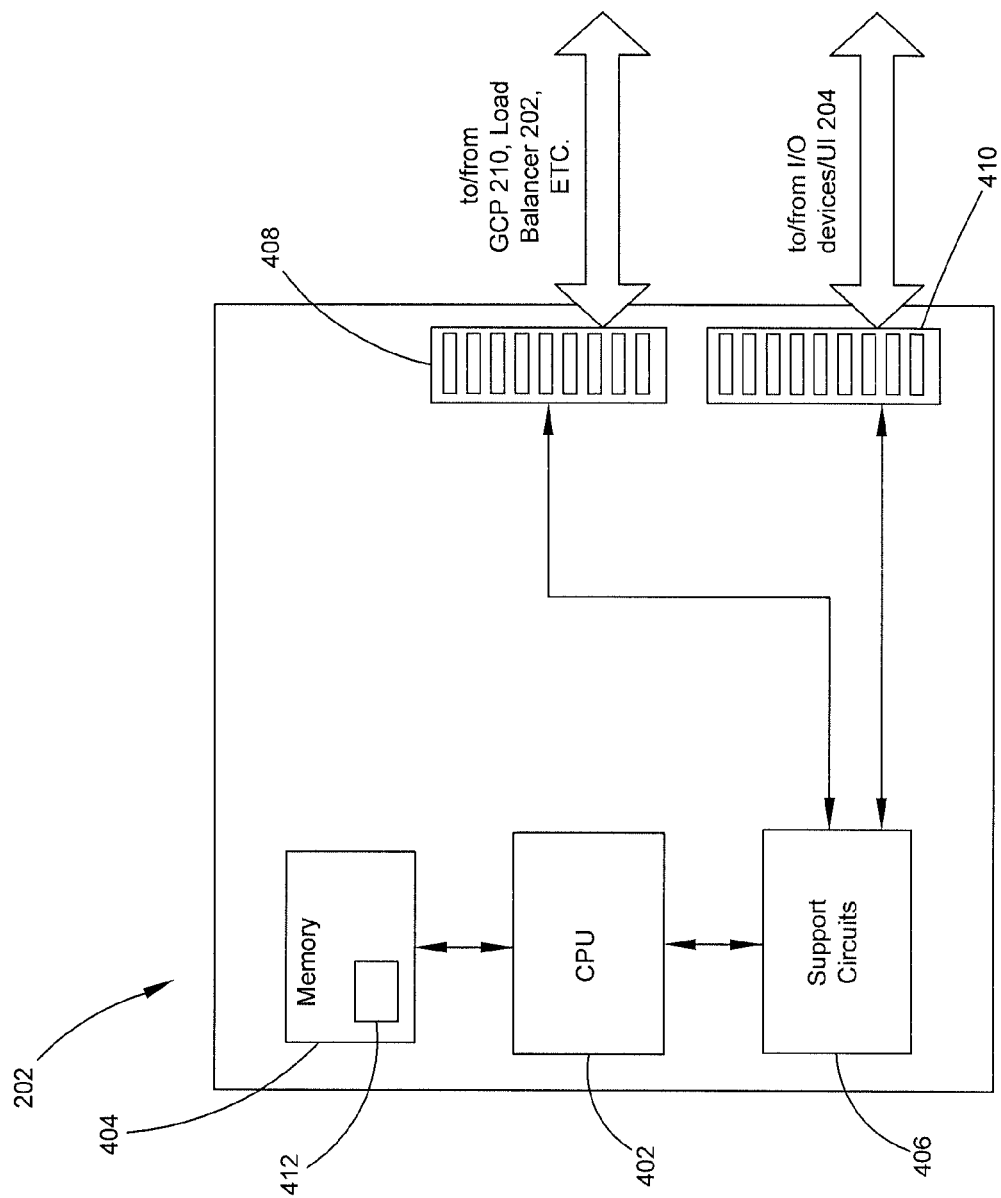
FIG. 4 is a schematic diagram of a controller that may be used to practice one or more embodiments of the disclosed subject matter.

FIG. 4 depicts a schematic diagram of a controller 400 that may be used to practice the disclosed subject matter. The controller 400 may be used to facilitate establishment of the UI created by server 204 and process the group call requests within the GCS 200 as described above. The controller 400 may be one of any form of a general purpose computer processor used in accessing an IP-based network such as a corporate intranet, the Internet or the like. The controller 400 comprises a central processing unit (CPU) 402, a memory 404, and support circuits 406 for the CPU 402. The controller 400 also includes provisions 408/410 for connecting the controller 400 to the first server/User Interface 204 and system components such as but not limited to the Load Balancer 202 and the Group Calling Pool 210 and one or more input/output devices (not shown) for accessing the controller 400 and/or performing ancillary or administrative functions related thereto. Note that the provisions 408/410 are shown as separate bus structures in FIG. 4; however, they may alternately be a single bus structure without degrading or otherwise changing the intended operability of the controller 400 or invention in general. Additionally, the controller 400 and its operating components and programming as described in detail below are shown as a single entity; however, the controller may also be one or more controllers and programming modules interspersed around the GCS 200 each carrying out a specific or dedicated portion of the diagnostic analysis as described earlier. By way of non-limiting example, a portion of the controller 400 or software operations may occur at the Load Balancer 202 and another a portion of the controller 400 or software operations may occur at the Group Calling Pool 210. Other configurations of the controller and controller programming are known and understood by those skilled in the art.

The memory 404 is coupled to the CPU 402. The memory 404, or computer-readable medium, may be one or more of readily available memory such as random access memory (RAM), read only memory (ROM), floppy disk, hard disk, flash memory or any other form of non-volatile or non-transient digital storage, local or remote. The support circuits 406 are coupled to the CPU 402 for supporting the processor in a conventional manner. These circuits include cache, power supplies, clock circuits, input/output circuitry and subsystems, and the like. A software routine 412, when executed by the CPU 402, causes the controller 400 to perform processes of the disclosed subject matter and is generally stored in the memory 404. The software routine 412 may also be stored and/or executed by a second CPU (not shown) that is remotely located from the hardware being controlled by the CPU 402.

The software routine 412 is executed when the disclosed method of processing group call requests is desired. The software routine 412, when executed by the CPU 402, transforms the general purpose computer into a specific purpose computer (controller) 400 that controls the various servers and GCS 200 in general or other similar actions. Although the process of the disclosed subject matter is discussed as being implemented as a software routine, some of the method steps that are disclosed therein may be performed in hardware as well as by the software controller. As such, the invention may be implemented in software as executed upon a computer system, in hardware as an application specific integrated circuit or other type of hardware implementation, or a combination of software and hardware. The software routine 412 of the disclosed subject matter is capable of being executed on computer operating systems including but not limited to Microsoft Windows XP and similar products from Microsoft of Redmond, Wash., Apple OS X, iOS and similar products from Apple of Cupertino, Calif. and LINUX. Similarly, the software routine 412 of the disclosed subject matter is capable of being performed using CPU architectures including, but not limited to, Apple Power PC, Intel x86, Sun service provider agentRC and Intel ARM.

Preferably to enable additional functionality and ease of use, a participant database is maintained locally or for embodiments disclosed herein at the GCS 200, in which, associated with each identifier used to select the invitees, is information associated with the conference participant. This may include user preferences as well as other data. The information may include the multiple contact numbers, for instance cell phone, home phone, work phone etc., time and date windows associated with the respective numbers. The device type associated with each of the multiple numbers as well as data accessibility for each device as well as a hunt sequence in which the numbers should be dialed if one number is not connecting, or whether each phone should be simultaneously dialed until one is picked up. The device type may include whether the device is a land line (PSTN), cellular, Wi-Fi or internet based. The participant database 208 may also include information regarding the phone, caller ID, SMS, email, fax, web based calendar and/or social media contact addresses and the preference of each participant regarding receipt of conference calls/invitations/notifications and the ability to access data or video with the respective device.

The database 208 may also include presence information that is updated in real time. Presence information is a status indicator that conveys ability and willingness of the participants—for example a user—to communicate. Presence information may be represented by manipulation of the graphical icon or avatar associated with the participant. Presence information may be derived passively through monitoring devices or systems engaged by the user or via affirmative acts by the user. In the disclosed subject matter, the presence information stored in the database 208 may be used in determining whether or when to initiate a conference call connection, or which channel would most likely reach the participant. The presence information may also be used to inform the administrator which of the participants are available when setting up the group or conference call.

Figure 5:
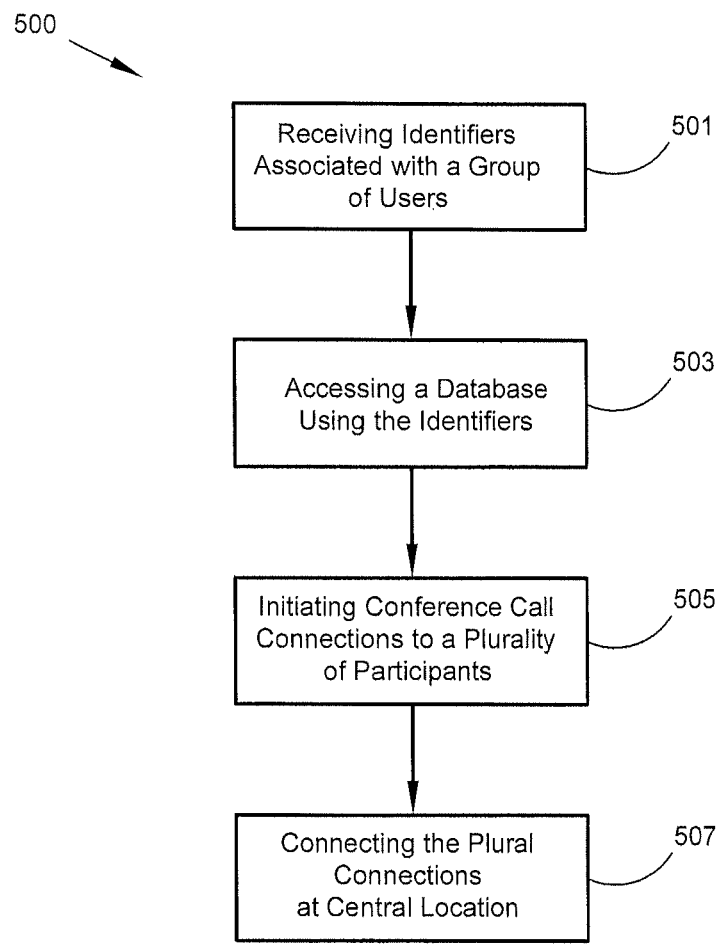
FIG. 5 is a flowchart depicting a method of establishing a conference call in accordance with the disclosed subject matter.

FIG. 5 illustrates a flowchart of a method 500 of establishing a conference call according to a disclosed embodiment. As shown in Step 501, the GCS 200 receives identifiers associated with the selected group of users selected for participation in the conference call. The GCS 200 accesses the database 208 using the identifiers to obtain the information regarding the selected participants as shown in Step 503. Using the information obtained from the database 208, the GCS 200 as shown in Step 505 initiates conference call connection to the participants. After establishing the conference call connections, the connection between the GCS 200 and each of the participants are connected to a conference call as shown in Step 507. In this embodiment each of the connections are to the GCS 200 and a secondary connection joins the separate connections to each other.

It is advantageous using the disclosed subject matter to send out invitations/notifications to the desired participants of the conference. Upon receipt of the invitations, the invitees may accept or decline the invitation or alternatively do nothing. These invitations/notifications may be sent out over multiple channels for each participant or over different channels for the participants. The GCS 200 may access the participant database 208 and for each user determine a preference for the invitation and customize the method of delivery for each participant via the respective preference in the same manner as selecting the channel for the group call. The GCS 200 may also be configured to send out invites only on a specified channel such as email, or all channels available email, fax, SMS etc., or combinations thereof. The selection of channel of delivery of the invitations may alternatively be selectable by the administrator, organization or by default at the GCS 200.

It is envisioned that there may be several layers of invitations, such as a scheduling invitation which is sent out several days prior to the conference call, a reminder invitation sent out a day to several minutes prior to the call and an immediate invitation confirming the participant's present availability to attend the call which may be sent out a few minutes to just prior to the call. It may be preferable as previously discussed for the participants to be able to respond to the invitations, and thus allow participants to be removed from the conference calling list or the conference rescheduled. Additionally, in responding to the invitation, the channel/device/number by which the user would like to participate in the conference could be included in the response. The administrator may also manually enter the invite channel and information for each participant. The invitations or notifications may advantageously be used to provide additional information related to the conference call. Such additional information may include, a notification the call will be recorded for subsequent storage and/or retrieval, identify other participants that are invited, identify documents to be discussed, the cost to participate in the call, call settings and other available call services. Call services may include transcription, voice to text or text to voice.

Invitees may be chosen based on a single phone number, or multiple contact numbers/IDs. For example, the administrator may simply select a contact in the address book, and the entire contents (work/mobile/e-mail/etc.) get sent to the system. In setting up the call, the administrator may also be given the opportunity to select the time the conference call is to be established, which preferably would be included in the invitations.

The administrator may establish the call settings related to invitations as well as other features. Those invited to participate in the call may be allowed to invite others to participate if the administrator has established such a setting. The administrator may also forward the bridge to another administrator.

An advantage of the disclosed subject matter is the ability to control the cost of the conference call. The GCS 200, after accessing the participant database 208 may be able to determine the termination costs for each participant based on the type of device and location. For example, a call terminated to a participant using the internet would have a minimum cost associated with it, whereas a call terminated on a land line would have likely have a greater cost associated with it. The cost may also be a reflection of geographic or political locations such as long distance or international calls. The cost may also be a function of the media whether voice, video or accompanying data. The total cost of the aggregate terminations, as determined by the GCS 200 may be presented to the administrator as an estimated cost per minute or with a realtime indicator showing the accumulated cost as the call proceeds. Advantageously, the administrator may select the specific participants, number of participants and/or device terminations based on estimated cost. For example, to minimize costs only those participant devices that terminate over Wi-Fi or the internet could be chosen and not those terminating using a cellular connection. The termination may be selected by combinations of termination type, participant, device type, geography or cost. Cost thresholds may also be set by the administrator and the GCS 200 would alert the administrator when they were approached or exceeded. A cost threshold established by the administrator may also be used by the GCS 200 to present possible combinations of participants that would fall below the threshold.

The GCS 200 could also automatically determine the lowest cost for a given conference call. This can be accomplished, for example, by accessing the participant database 208 and contacting the participants using the lowest cost channel available to each participant. A pre-paid embodiment may also be available where minutes, participants and/or terminations are tolled against the prepaid amount, on a participant or conference basis.

A significant feature of the disclosed subject matter is the availability to segment call participants into groups or caucuses and apply call control features to the group as a whole. This feature can be useful in a mediation or negotiation type environment where participants representing different interests are connected to a common conference call. Groups representing common interests can be segregated from the other callers, but be able to caucus among themselves over the conference call connection, and then join back the conference call without having to reestablish the connection. The participants may be assigned to caucuses by the administrator or as a function of information obtained from the database 208. For example, in a negotiation, participants of a conference call representing the buyers may be grouped as one caucus while the selling party's representatives are in a separate caucus, while a third caucus may be third party such as underwriters. The buyers, after receiving the sellers' pitch, may want to caucus with each other to discuss the details and issues prior to making an offer. The administrator may request that the buyers' caucus be muted to the other caucuses and likewise the sellers' caucus muted to the buyers' caucus. After the caucuses have their internal discussions, the three caucuses may be rejoined and communications enabled between them to complete the deal. The different caucuses preferably would be presented to the administrator though the GUI and facilitate the request for the caucus control features to the GCS 200.

Figure 6:
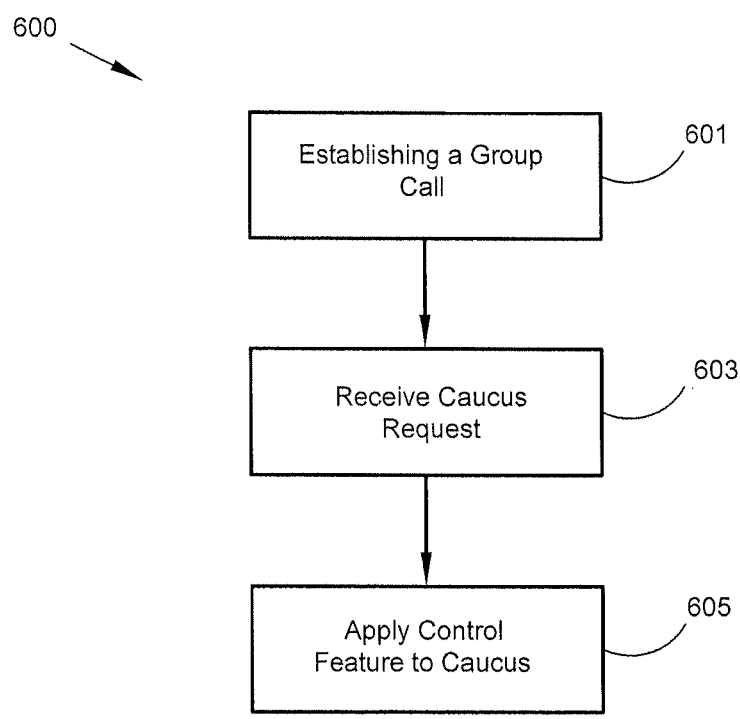
FIG. 6 is a flowchart depicting a method for implementing a call with the caucusing feature; and, FIG. 7 is a flowchart depicting a disclosed method by which disconnected participants of the call are automatically reconnected.

FIG. 6 is a simplified flowchart of a disclosed method 600 for implementing a call with the caucusing feature. In Step 601 the conference call is established among the selected participants. The GCS 200 receives a caucus request from the administrator as shown in Step 603. The caucus request preferably identified a caucus and the control feature(s) to be applied to the identified caucus. The GCS 200 executes (applies) the control feature on members of the caucus while not applying the control feature to the other participants which are not members of the identified caucus as shown by Step 605.

The control features include muting, isolating, enabling eavesdropping, blackout, sound proofing and connection dropping, or any other feature that may be applied to an individual participant as described previously. The control feature of isolating in connection with the caucus feature prevents any communication to or from the caucus while allowing those within the caucus to continue to communicate with each other over the conference call connections. The control feature of eavesdropping allows the administrator or designated caucus to eavesdrop on another selected caucus. This type of control would be useful for a mediator or mediator group in monitoring the respective parties' deliberations. The blackout call control feature prevents any communication within or outside the identified caucus such that each member of the caucus would figuratively be in the dark. The sound proofing control feature would prevent the members of the caucus from hearing from members outside the identified caucus and connection dropping would disconnect the members of the caucus from the conference call completely.

An advantage afforded by the disclosed subject matter from the perspective resources and usability is avoiding a connection to voice mail. The connection to voice mail (or voice messaging) not only subjects each of the participants to the recorded greeting, but would also result in a recording of the conversation, which may not be desired. In addition, the duration of the connection to the voice mail may incur significant costs. As discussed above, the administrator may have the ability to disconnect the connection to the voice mail but that requires the administrator to discern the connection, and as noted herein, the administrator may not be connected to the call while the connection to the voice mail is made. Since all the connections are made from and pass though the GCS 200, voice recognition software may be employed, such as the software that converts speech to text, to detect the tale-tale words contained in typical voice mail greetings. For example, the presence of "please leave a message," "we are not available" or "at the beep," etc. may reveal a connection to voice mail.

Alternatively, the GCS 200 may require an affirmative action upon the part of the participant. For example, upon answering the phone, the participant may be required to respond to a command, such as press #1, or say "connect" within a predetermined amount of time. If the command is not followed, the central location would conclude the voice messaging device had answered the phone. Upon determining the connection is to a voice messaging device, the GCS 200 may disconnect and try another contact number for the user, or may retry later. The determination that a connection is made to a voice mail may be made prior to connecting the particular user to the conference call, and thus the connection/disconnection and retry would be seamless from the perspective of participants on the conference call.

Another methodology for avoiding connecting to a voice mail is to set a threshold on the number of rings allowed prior to answering. If the number of rings exceeds a predetermined threshold before the call is answered, it is likely the user is not available and the voice messaging device would answer the call. Therefore by establishing an upper limit on the number of rings, a vast majority of connections to voice messaging devices can be avoided. Additionally, after a predetermined amount of attempts to connect, the participant may be removed from the invitees to the conference, or a new contact for the participant may be tried.

Figure 7:
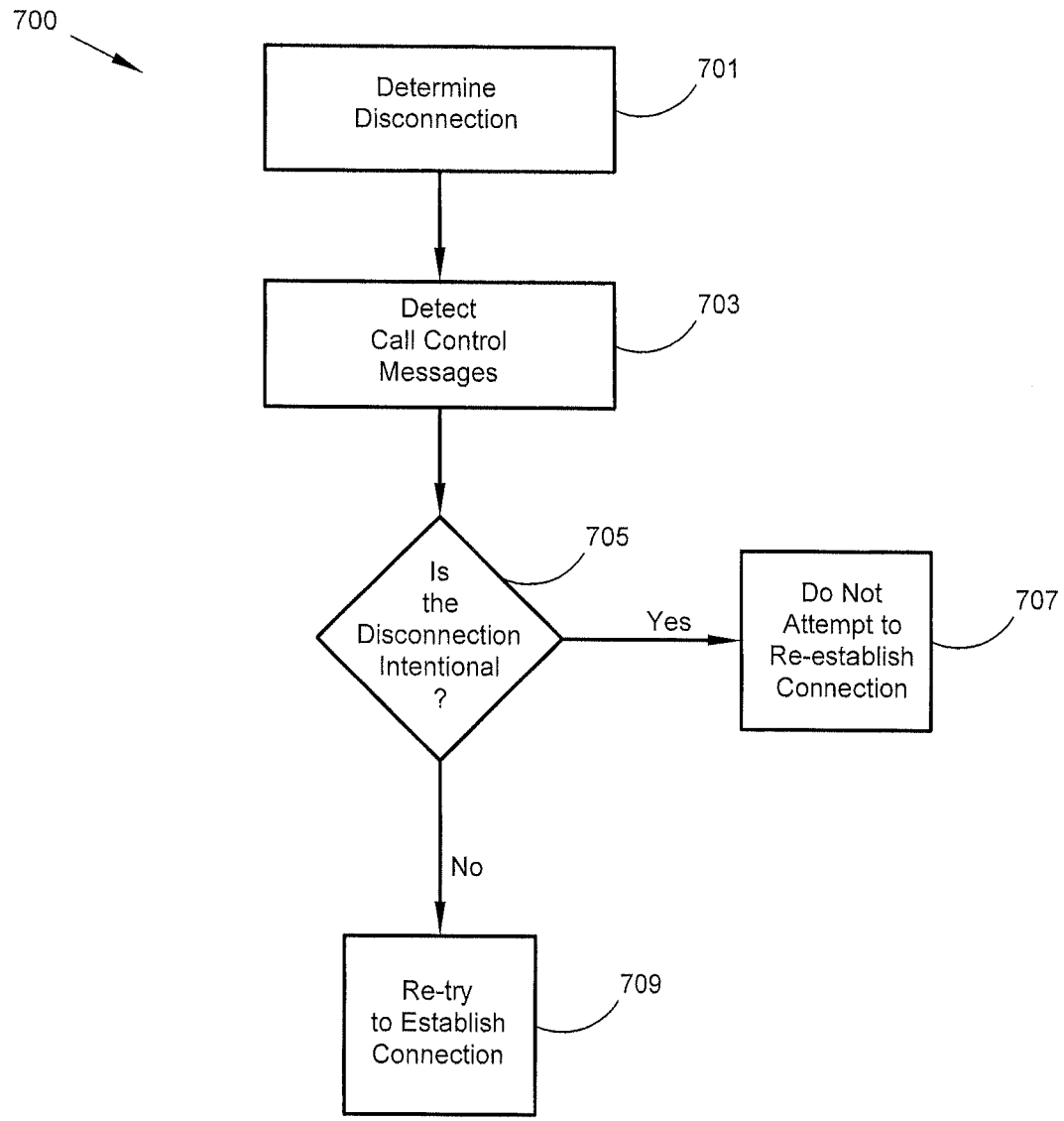

Another feature of the disclosed subject matter is the ability of the administrator to select a setting for the automatic reconnection of a disconnected conference participant. FIG. 7 is a flowchart of a disclosed method 700 by which a disconnected participant of the call is automatically reconnected. The GCS 200 advantageously determines if the participant is disconnected, whether intentionally or inadvertently. Inadvertent disconnections are desirably reconnected, whereas intentional disconnections are not re-established. As shown in Step 701, the GCS 200 determines whether a participant has been disconnected. If there has been a disconnection, call control messages are detected by the GCS 200 as related to the disconnected participant as shown in Step 703. In Step 705 it is determined whether the disconnection was intentional. An intentional disconnect may be determined by the receipt of call control information such as a "bye" message in SIP, or a disconnect message in PSTN systems. The absence of receipt of the call control information at the GCS 200 may be indicative of an unintentional disconnect. If the disconnection was intentional the GCS 200 does not attempt to re-establish the connection as shown in Step 707. If the disconnection is not intentional, the GCS 200 may reconnect as shown in Step 709 without requiring intervention from the call administrator or other participants.

Available settings by the call administrator may also be established for unsuccessful dial-out. The setting may include how many times to retry, how often, or whether to engage a call hunting sequence. The administrator may configure the settings to require a PIN to be entered by the participant or participant's device prior to joining or rejoin the group call.

An aspect of the disclosed subject matter is the ability of the call manager, or GCS 200 to establish the order in which the invitees are connected. For example in a conference having several senior members along with a collection of more junior members, the junior members would generally be connected first and only after the junior members, the connection with the senior members of the group be initiated and added to the call, thus minimizing their wait times. The order of calling may be by group, such as senior members junior members, or individually where the most senior or high level conference member would be contacted to join the call only after most or all of the junior or low level conference members have connected.

The establishment of contact order may be made by the call administrator by designating prior to the call the preferential order or classes of attendees along with the assignment of attendees to the respective class. The call administrator may also assign an order to each attendee irrespective of title or class. Preferably, within an organization, each member may be pre-assigned a value based on position, seniority, or cost, or any other relevant category and stored within the database 208 accessible by the GCS 200, or locally which may automatically arrange the calling of the participants. In the event a lower ranked conference participant doesn't answer in the order called, the participant can be skipped until all other participants similarly situated are contacted and connected prior to retrying to connect the skipped participant. If the skipped participant still hasn't connected to the call, the next higher level of participants may be contacted or connected prior to retrying again to connect the skipped participant. The sequence of retrying skipped participants may be established by the administrator, organization or default to a procedure designated by the GCS 200.

The GCS 200 may access the database 208 to determine the capabilities of the participant devices such as whether video or data is available. This information may be provided to the administrator on the GUI such that the administrator may decide whether to establish a video or data conference call connection.

Call, conference call or group call are used throughout the specification interchangeably and are meant to be inclusive of video conferencing, data conferencing and audio conferencing and combinations thereof. The GUI or interface used by the administrator or participants may be a computer, smart phone, cellular phone, tablet, internet phone, PSTN phone or any other device capable of communicating the administrator's request to the GCS 200.

In embodiments of the disclosed subject matter, the administrator may be allowed to change from one participant to another participant. The option to allow administrator switching is a call setting and along with other call settings and control features are implemented with a message to the central location.

While the foregoing is directed to embodiments of the disclosed subject matter, other and further embodiments of the invention may be devised without departing from the basic scope thereof, and the scope thereof.

What we claim is:

1. A method of establishing a conference call between an administrator and a group of users selected by the administrator as participants in the conference call, wherein the administrator and users are remote from a central location, comprising:

receiving call information associated with the group of users from the administrator at the central location;

initiating plural conference call connections from the central location to the participants based on call information;

initiating an administrator conference call connection from the central location to the administrator; and, connecting the plural conference call connections to thereby allowing communications between the participants and connecting the administrators conference call connection at the central location, to thereby allow communications between the participants and the administrator;

wherein the call information comprises connection values and at least two of the plural conference call connections are initiated in a sequence based on the connection values:

wherein the connection values are based on one or more factors selected from the group consisting of age, seniority, position, wage, management level, organization, user preference and administrator preference.

2. The method of claim 1, wherein the connection values are based on one or more factors selected from the group consisting of age, seniority, position, wage, management level, and organization.

3. A method of establishing a conference call between an administrator and a group of users selected by the administrator as participants in the conference call, wherein the administrator and users are remote from a central location, comprising:

receiving call information associated with the group of users from the administrator at the central location;

initiating plural conference call connections from the central location to the participants based at least on call information;

initiating an administrator conference call connection from the central location to the administrator; and, connecting the plural conference call connections to thereby allowing communications between the participants and connecting the administrators conference call connection at the central location, to thereby allow communications between the participants and the administrator;

wherein the call information consists of the type of connection termination, device type, and device capabilities for at least one of the participants;

determining an estimated cost of the conference call based on the type of connection termination; and, providing the estimated cost of the conference call to the administrator.

4. The method of claim 1, further comprising accessing a database for a plurality of conference call settings associated with at least one of the participants, wherein the settings are selected from the group consisting of connection termination types, media type, voice mail detection, call hunting, disconnection retry, retry period and connection sequence.

5. A method for managing a group call between an administrator and each of a group of invitees comprising:

initiating a first group call connection from a central location and initiating at least one or more second group call connections from the central location to join a group call administrator and at the least one group call invitee detecting a disconnection of one of the invitees;

detecting call control messages from the call connection of the disconnected invitee;

determining if the disconnection is inadvertent or intentional based on the call control messages; and, re-establishing the conference call connection to the disconnected invitee when the disconnection was determined to be inadvertent;

wherein the call control messages are Session Initiated Protocol messages.

6. The method of claim 5, wherein the step of detecting call control messages from the call connection of the disconnected invitee, includes detecting the absence of call control messages from the call connection of the disconnected invitee.

* * * * *